United States Patent [19]
Dobbek

[11] Patent Number: 5,890,209
[45] Date of Patent: Mar. 30, 1999

[54] SYSTEM AND METHOD FOR REDUCING TARGET TRACK SEEK TIME IN A DATA STORAGE DISK DRIVE

[75] Inventor: Jeffrey Joseph Dobbek, San Jose, Calif.

[73] Assignee: International Business Machines Corporation, Armonk, N.Y.

[21] Appl. No.: 934,299

[22] Filed: Sep. 18, 1997

Related U.S. Application Data

[63] Continuation of Ser. No. 363,445, Dec. 22, 1994, abandoned.

[51] Int. Cl.⁶ .................................................. G11B 21/08
[52] U.S. Cl. ........................................ 711/112; 360/78.04
[58] Field of Search ............................... 744/4, 111, 112; 360/48, 72.1, 77.08, 78.04, 78.05, 78.06, 78.07, 78.09, 78.13, 78.14

[56] References Cited

U.S. PATENT DOCUMENTS

| | | | |
|---|---|---|---|
| 4,710,687 | 12/1987 | Kanda | 360/78.06 |
| 4,746,998 | 5/1988 | Robinson et al. | 360/72.1 |
| 4,879,612 | 11/1989 | Freeze et al. | 360/78.09 |
| 5,222,054 | 6/1993 | Muraoka et al. | 360/78.05 |
| 5,483,507 | 1/1996 | Ogino | 360/78.14 |
| 5,500,848 | 3/1996 | Best et al. | 360/48 |
| 5,523,903 | 6/1996 | Hetzler et al. | 360/77.08 |
| 5,568,627 | 10/1996 | Leshay et al. | 395/439 |

*Primary Examiner*—Eddie P. Chan
*Assistant Examiner*—Gary J. Portka
*Attorney, Agent, or Firm*—Paik Saber

[57] ABSTRACT

A no-ID zone-bit-recording data recording disk drive system having an interface processor and a servo processor is described wherein track seek time is substantially reduced by the following two step seek process. The interface processor converts a logical block address (LBA) to an estimated physical block address (EPBA) using a defect map where the EPBA is communicated to the servo processor. The servo processor uses a zone table and converts the EPBA to an estimated zone-cylinder-head-sector (ZCHS) value which is used to initiate actuator arm movement and moving the appropriate head over the disk in the direction of sought after track. Concurrently with the servo processor computation and actuator arm motion, the interface processor generates an exact PBA and communicates the exact PBA to the servo processor. The servo processor converts the exact PBA to exact ZCHS values and modifies the actuator arm motion so the head can be exactly positioned over the sought after track. By allowing the servo processor to map PBA to ZCHS and further utilizing EPBA to initiate actuator arm motion before the exact PBA becomes available, substantial reduction in track seek time is attained.

33 Claims, 6 Drawing Sheets

PS= # OF PRIOR SKIPS
S= OMITTED VIRTUAL SECTOR
C BITS= VS #
B BITS= VT #

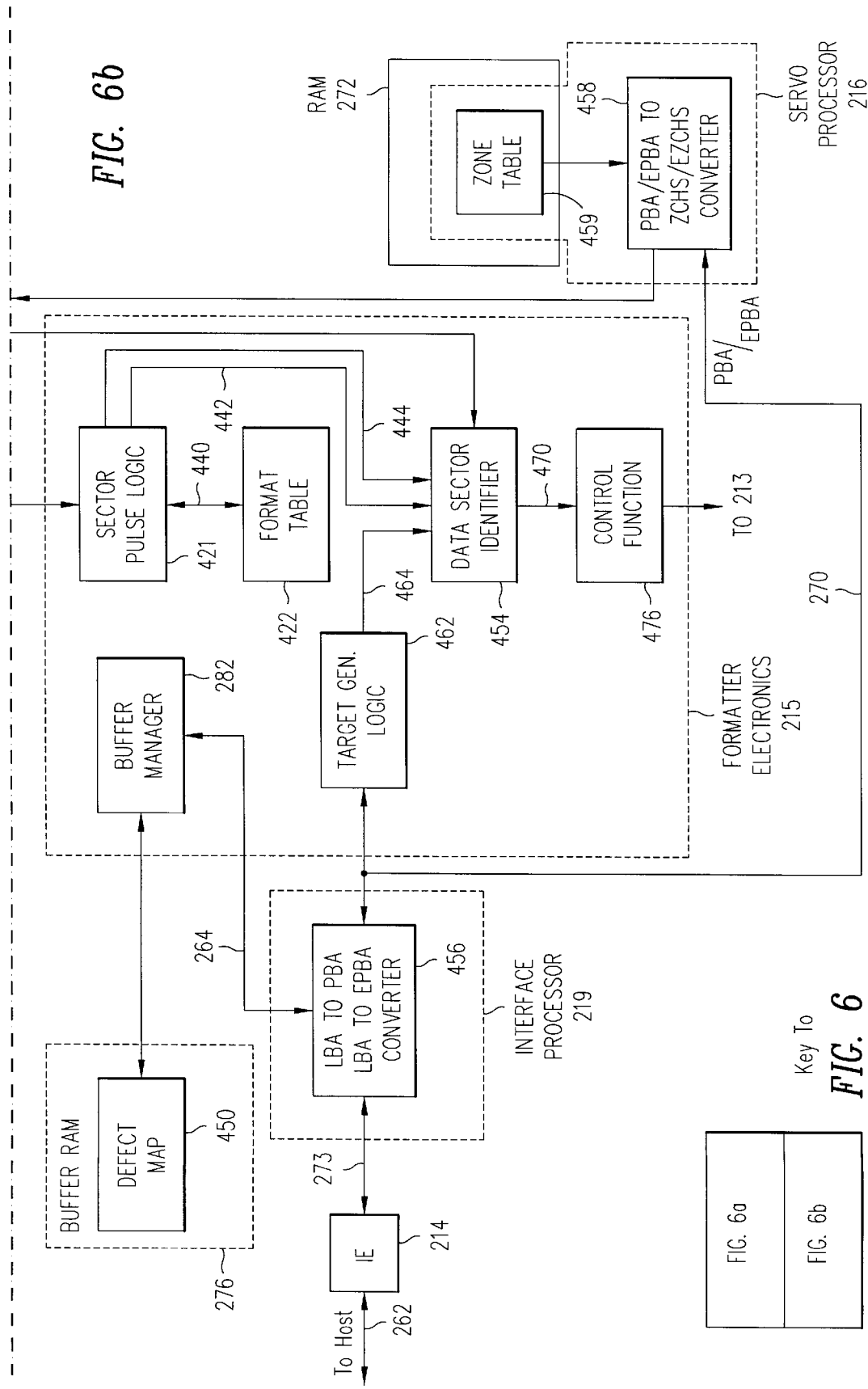

SYSTEM AND METHOD FOR REDUCING TARGET TRACK SEEK TIME IN A DATA STORAGE DISK DRIVE

RELATED APPLICATIONS

This is a continuation of U.S. patent application Ser. No. 08/363,445, filed Dec. 22, 1994, now abandoned.

The co-pending U.S. patent application Ser. No. 08/628,304 (which is a continuation of U.S. patent application Ser. No. 08/173,588, now abandoned), entitled "System and Method For Skip-Sector Mapping In A Data Recording Disk Drive", and assigned to the assignee of the present application, is hereby incorporated by reference in its entirety.

The U.S. patent application Ser. No. 08/082,826 (which is a continuation of U.S. patent application Ser. No. 07/727,680, now abandoned), now matured into U.S. patent application Ser. No. 5,500,848, entitled 'Sector Servo Data Recording Disk Having Data Regions Without Identification (ID) Fields', and assigned to the assignee of the present invention, is hereby incorporated by reference in its entirety.

BACKGROUND OF THE INVENTION

1. Field of the Invention

This invention relates in general to data storage disk drives commonly referred to as disk drives, and in particular to a system and method for reducing track seek time in such disk drives.

2. Description of the Background Art

In data storage systems such as magnetic disk drives, digital information is magnetically stored upon a surface of a magnetic medium such as a magnetic storage disk in a set of concentric circular patterns called "tracks". The digital information is represented by selectively polarizing the surface of the disk. When this information is read back from the disk, the magnetic polarization of the medium is sensed and converted to an electrical output signal. The read and write operations are performed by read/write electronics in conjunction with a read/write head which "flies" over the surface of the rotating disk and provides an output signal.

Typically, storage disks of a disk drive are stacked in a "disk stack" (also known as "disk pack") which are mounted for rotation together on a single spindle. Each side of each disk in the disk stack has a surface which is usually used to store information. Each surface of a disk in the disk stack is usually exposed to at least one head responsible for reading and writing information on that particular surface. Typically, all the magnetic heads which are mounted on an actuator arm move in tandem radially over the surfaces of the disk so that they are all at the same approximate disk radius at the same time.

In order to accurately move a magnetic head to a desired track and position the head over that track a servo system is utilized. The servo system performs two distinct functions known as a "seek" or "access" function and "track following" function. During the "seek" operation the servo system moves a read/write head to a selected track from a previous track or from a park position as quickly as possible. When the head reaches the desired track, the servo system begins a "track following" operation in which it accurately positions the head over the centerline of the selected track and maintains the head in that position as successive portions of the track pass by the head.

It is important to note that during a seek operation the actuator arm where the head is mounted, in general, is moved as fast as possible so as to minimize the time required for that operation. Since the seek time is one of the most important factors considered in measuring the overall performance of a disk drive, it is essential to minimize the time it takes for carrying out the seek operation as much as possible.

In order to read and write data from the correct location in the disk pack, the data sectors in the disk pack are identified by a cylinder address, head address and sector address (CHS). A "cylinder" identifies a set of specific tracks on the disk surfaces in the disk pack which lie at equal radii and are, in general, simultaneously accessible by the collection of heads. The head address identifies which head can read the data and therefore identifies the disk that the data is recorded on. Each track within a cylinder is further divided into "sectors" for storing data and servo information.

Many modern disk drives also use a concept known as zone bit recording (ZBR) as taught by Hetzler in U.S. Pat. No. 5,210,660 in which the disk surface is divided into radial zones and the data is recorded at a different data rate in each zone. The addition of zones requires expansion of the cylinder, head, sector (CHS) identification scheme (addresses) to a zone, cylinder, head, sector (ZCHS) identification scheme.

Some disk files have servo information only on a dedicated surface on one disk in a disk stack. However, many modern disk drives use a servo architecture known as "sectored servo" (also referred to as "sector servo") as taught by Hetzler, U.S. Pat. No. 5,210,660 where servo information is interspersed with the data stored on each disk surface. The servo sector in sectored servo architecture contains positioning data on each track to help the magnetic head stay on that track. This latter approach is preferred because it can be implemented at low cost without extra components beyond those required for storing data and because it provides the servo information at the data surface which is being accessed, thereby eliminating all thermal sources of track misregistration (TMR).

The use of either sectored servo or dedicated servo surface architectures and the implementation of either of the two are well known to those skilled in the requisite art.

There are also a number of methods used to format disk files, one of which is fixed block architecture (FBA) method which is used in both dedicated servo disk files and sectored servo disk files. In an FBA formatted disk file, each disk track is divided into a number of equal-sized segments, and each segment is divided into sectors containing servo information, identification information (ID), and data.

A typical segment 9 of a track on an FBA formatted disk utilizing sectored servo architecture is illustrated in FIG. 1. The segment 9 comprises sequentially a servo sector 10, and identification (ID) region 11 and a data sector 12. Servo sector 10 further comprises information such as write-read and speed Field 15, address mark (AM) field 16 and position error signal (PES) field 17. The ID region 11, which is written onto the disk during the format operation contains specific information concerning the data sector 12 which can be used during normal operation, either writing or reading, to identify the succeeding data sector 12. The ID region 11 typically comprises a read/write and speed field 18, VCO sync field 19, encoder/decoder flush field 20, sync byte 21, and ID and CRC field 22. The data sector 12 typically comprises fields 23–26 which correspond to the ID fields 18–21, and data and ECC field 27. In a disk file having an ID region, the CHS/ZCHS or LBA information is typically recorded on the data ID field 22 immediately preceding the data sector.

Recently, a new method and system has been developed to increase the capacity of disk drives known as the no-ID format and the disk drive systems utilizing no-ID format are commonly referred to as no-ID disk drive systems. This format has been taught by Hetzler in the aforementioned U.S. Pat. No. 5,500,848, which is assigned to the assignee of the present invention. For no-ID disk drives implementing a sector servo architecture, a "full track number identifier" in the position field in the servo sector of a given track is used in combination with a defect map to uniquely identify the requested data sectors and thereby completely eliminate the use of ID regions.

Briefly stated, bad sectors are mapped out of the disk file by means of a defect map. At disk format time, each sector is written to and read from to determine whether it is usable or defective. Clusters of defective sectors are marked bad by recording in the defect map the sector location identifier of the first bad sector in the cluster and the quantity of consecutive bad sectors in the cluster. During read/write operations, the disk file performs logical block address (customer or system addressable block) to physical block address (total number of sectors available on a disk drive) conversion (logical to physical sector conversion) by searching the defect map for an entry having a value less than or equal to the requested logical sector location identifier. If none is found, the physical block address is equal to the logical block address. If an entry is found, the corresponding offset representing the quantity of consecutive bad sectors is extracted from the defect map and added to the logical block address of the requested sector to produce the physical block address for that sector. The PBA in turn is translated to either CHS (no zone recording) or ZCHS (zone recording present) in order to access a physical disk location.

Once the disk drive completes the required seek operation to the cylinder and head identified, or to the zone, cylinder and head identified, the recording channel scans for the desired data sector by examining the servo sector associated with each data sector as it passes under the head. When the appropriate data sector is found, the data is read and the operation is completed.

In prior no-ID data storage disk drives, having one or two processors (interface processor and servo processors), the PBA of a specific track must be calculated and converted into a CHS or ZCHS value before the actuator is instructed to seek the track. For example, in the case of the two processor design, the interface processor generally performs the logical block address (LBA) to PBA conversion and PBA to CHS/ZCHS for the first possible track where the data is located. The CHS/ZCHS is then used to start a track seek operation by applying necessary signals to servo electronics which in turn provides the necessary current to voice coil which in turn causes the actuator to move.

The process of performing LBA to PBA and PBA to CHS/ZCHS conversions for the first possible track, communicating that information to the servo processor, and then carrying out the seek operation is a time consuming operation and degrades the overall performance of the disk drive. The overall performance of the disk drive is degraded because the aforementioned conversions directly contribute to the track seek time overhead.

Therefore, there is a great need for an invention that can substantially decrease the track seek time overhead in disk drives and further eliminate the overall performance degradation associated with the track seek in no-ID disk drives.

SUMMARY OF THE INVENTION

It is therefore an object of the present invention to provide a system and method for reducing the time it takes to initiate and conduct a track seek operation in a no-ID disk drive system having dual processors.

It is a further object of the present invention to provide a system and method for reducing the time it takes to conduct a track seek operation in a no-ID disk drive system having zone bit recording architecture.

It is yet another object of the present invention to provide a system and method for reducing the time it takes to conduct a track seek operation in a no-ID disk drive system having a single processor.

It is yet another object of the present invention to provide a system and method for reducing the time it takes to conduct a track seek operation in a disk drive system having an ID region and a defect table.

Toward this end and in accordance with the present invention, a method and means is described wherein in a disk drive system having an interface processor and a servo processor, zone bit recording, sectored servo architecture, and no-ID servo sector features, the interface processor receives a logical block address (LBA) from the host, the interface processor initially generates an estimate address of the first physical block address (EPBA) and communicates that address to the servo processor using the "seek approximate PBA" command.

In order to generate either a PBA or EPBA from an LBA, the interface processor utilizes a defect map. The defect map contains two mapping tables. The first mapping table (virtual track table) contains entries for virtual tracks which are defined as groups of LBAs having shared high order bits. The entries themselves are pointers into the second mapping table where each index location identifies a group of sectors located on the virtual track corresponding to the index location. The second mapping table (virtual sector table) contains entries for skipped sectors. The entries are arranged in logical order, and contain only the low order LBA bits corresponding to the next usable (non-skipped) sectors. The EPBA comprises the algebraic sum of the LBA and the relevant entry in only the virtual track table.

The servo processor then uses the EPBA and the entries in the zone table to calculate the estimated ZCHS (EZCHS) value. The servo processor then communicates the EZCHS value to the servo electronics. The servo electronics in turn communicates the EZCHS to the voice coil in the form of a current change which begins moving the actuator toward the estimated track.

While the actuator is moving toward and seeking the estimated track, the interface processor computes an exact PBA using the entries in the virtual sector table. The exact PBA is calculated by mapping the LBA to a PBA as follows. A mask is used to select the high order bits which make up the virtual track number. The virtual track number of the LBA is used to select an entry in the first table, which in turn provides an index to a search start point in the second table. The next entry in the virtual track table provides the search boundary. Commencing with the search start point, the second table is searched in increasing numerical order or binarily using the low order bits of the LBA until a larger entry is found (corresponding to a sector beyond the LBA) or until the search boundary is reached. The resulting index point is then added to the LBA to provide the exact PBA. The exact PBA is then communicated to the servo processor. The servo processor then uses the exact PBA and the entries in the zone table to calculate exact ZCHS value which is then communicated to the servo electronics. The servo electronics then uses the exact ZCHS value and adjusts the estimated track-seek target already in progress accordingly toward the actual (desired) track-seek target.

The result is a substantial reduction in the overhead time it takes to carry on a track seek operation in a given disk drive. This is due to the fact that according to the present invention, the actuator is already in motion over the disk surface toward the estimated track (which is a very close approximation of the actual track) while the address of the exact track is being calculated. By having the actuator in motion in the right direction toward the desired track (sought after track, targeted track) rather than waiting until the exact target track address is calculated, substantial reduction in seek time overhead can be attained.

Note that an LBA is typically numbered from zero to N where N is the total number of blocks (sectors) available for customer and/or system use. Furthermore, a PBA is defined to include all sectors numbered from zero to M where M is greater than N and where M represents the total number of possible sectors on the disk drive. The physical storage space represented by the total number of PBAs (M PBAs) in the disk drive identifies all LBAs plus all skip sectors.

In an alternative embodiment, the LBA to PBA and the PBA to ZCHS calculation takes place in the interface processor rather than in the servo processor. Therefore, initially an estimate of the first PBA which comprises zone, cylinder, head and sector information is calculated in the interface processor and thereafter communicated to the servo processor. The servo processor then determines the target track based upon the estimated ZCHS value and provides the necessary signal to the servo electronics. The servo electronics in turn provides the necessary signal to the voice coil in the form of a current to begin moving the actuator toward the estimated track. While the actuator is moving toward and seeking the estimated track, the interface processor computes an exact PBA for the desired track. The exact PBA is used to compute the zone, cylinder, head and sector information which is then communicated to the servo processor which in turn is communicated to the servo electronics in the form of currents. The servo electronics then uses the exact current value to adjust the actuator's motion toward the desired track.

In an alternative embodiment, the disk drive system comprises only a single processor rather than two processors. In this embodiment, the processor initially computes an estimate of the first physical block address (PBA). The estimated PBA (EPBA) in then converted into CHS/ZCHS value. The processor then determines the target track based upon the estimated ZCHS value and provides the necessary signal to the servo electronics which is the necessary current in the voice coil to begin moving the actuator toward the estimated track. While the actuator is moving toward and seeking the estimated track, the processor computes the exact PBA for the actual sector. The exact PBA is then used to calculate the exact ZCH value and replaces the estimated track seek target already in progress accordingly toward the desired track seek target.

The present invention and alternative embodiments described above are equally applicable to disk drive systems having ID regions and a defect table or disk drive systems lacking zone bit recording feature or the combination thereof.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode for carrying out the invention. This description and the number of alternative embodiments shown are made for the purpose of illustrating the general principle of the present invention and is not meant to limit the inventive concepts claimed herein.

Figure 1:
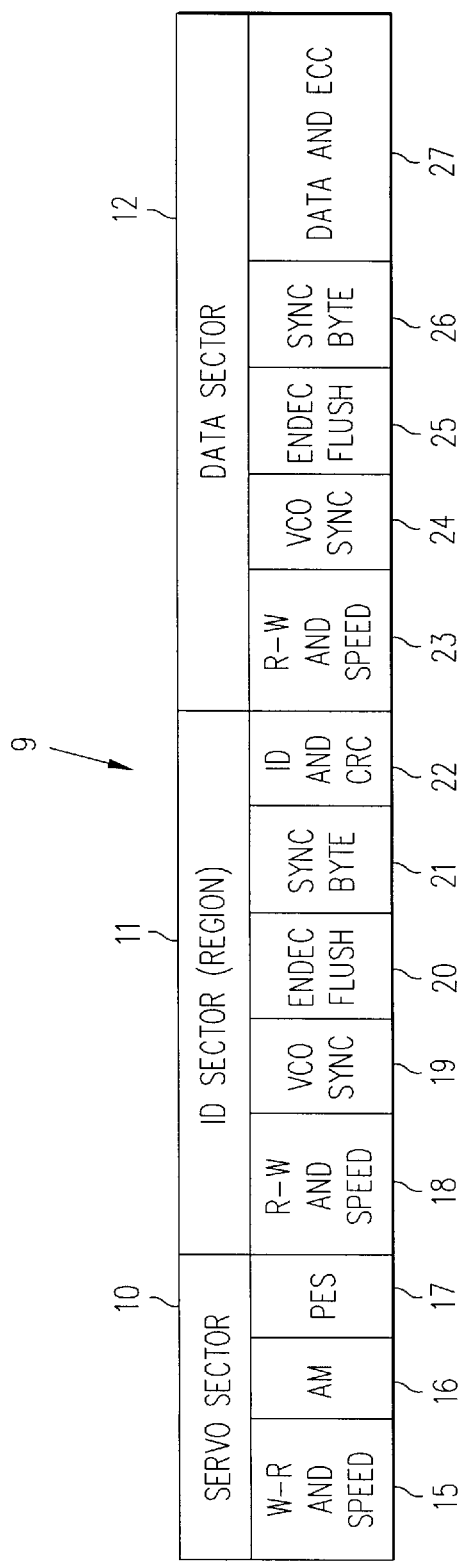
FIG. 1 is a diagram showing the sectors of a segment of a track on a disk file formatted for conventional sectored FBA.
Figure 2:
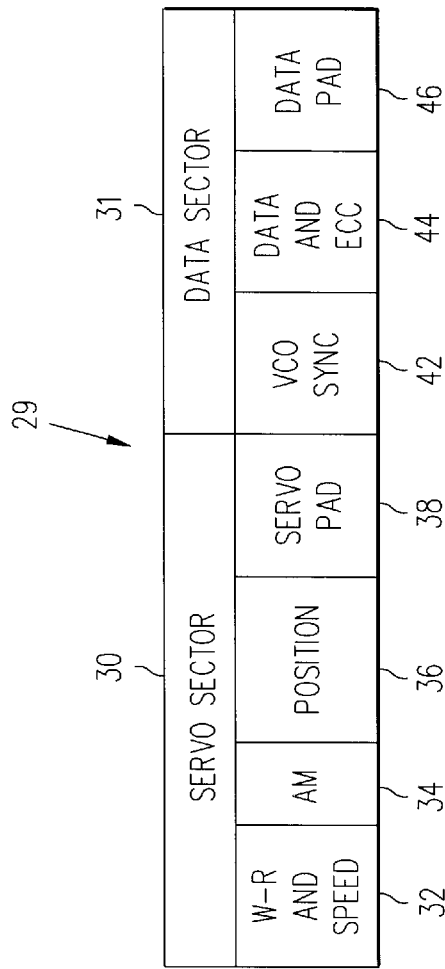
FIG. 2 is a diagram showing the sectors of the no-ID segment of a track on a disk file formatted in accordance with the preferred embodiment of the present invention.

Now referring to FIG. 2, there is shown a schematic diagram of a no-ID segment 29 of a track of a disk used in the preferred embodiment of the present invention. The segment 29 comprises a servo sector 30 and a data sector 31. The servo sector 30 typically comprises write-to-read recovery and speed compensation field 32, address mark field 34, position field 36, and servo pad field 38. Data sector 31 typically comprises a VCO sync field 42, data and ECC field 44 and data pad field 46.

Figure 3:
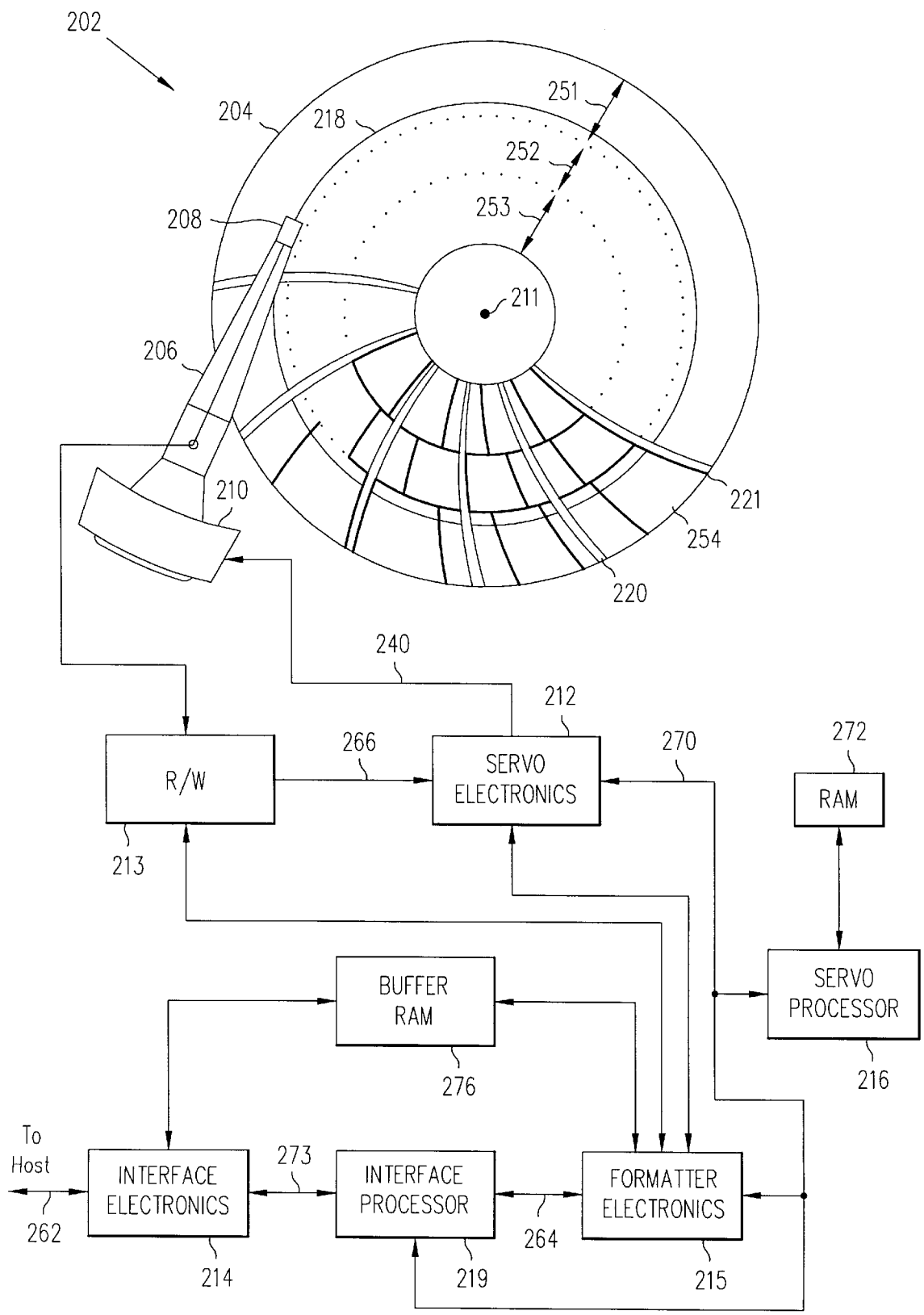
FIG. 3 is a schematic diagram showing an FBA disk drive in accordance with the preferred embodiment of the present invention having two processors.

Now referring to FIG. 3, there is shown a preferred embodiment of disk drive 202 of the present invention. Disk drive 202 is formatted using a fixed block architecture (FBA) utilizing sector servo, no-ID and zone-bit recording features. Drive 202 comprises a magnetic recording disk 204 mounted on a shaft (not shown), an actuator arm 206, a recording head 208 (also referred to as a recording transducer) mounted on said arm 206, a voice coil 210 in communication with actuator arm 206 and controlling the movement of arm 206 and thus the positioning of head 208 over the disk surface. Drive 202 further comprises servo electronics 212 in communication with voice coil 210 and controlling the amount of current in the voice coil, read/write (R/W) electronics 213 in communication with servo electronics 212, formatter electronics 215, and actuator arm 206. R/W electronics 213 provides the means for reading data from the disk and writing data onto the disk. Drive 202 also includes an interface electronics 214 in communication with an interface processor 219 and a host computer (not shown), a formatter electronics 215 in communication with interface processor 219, servo electronics 212, and R/W electronics 213, a servo processor 216 in communication with servo electronics 212, formatter electronics 215, interface processor 219 and a RAM 272.

Disk 204 comprises a center of rotation 211 and is divided for head positioning and data storing purposes into a set of radially spaced tracks, one of which is shown as track 218. The tracks are grouped radially into a number of zones, three of such zones are shown as zones 251, 252 and 253. The number of tracks in each zone is generally different from the number of tracks in the other zones and the number of data sectors per track generally varies from zone to zone. Disk 204 further comprises a plurality of servo sectors 220 which extend across the tracks in a generally radial direction. Each track has a reference index 221. Within each zone, the tracks are also circumferentially divided into a number of data sectors 254. In the preferred embodiment, the data sectors 254 contains no ID region. In accordance with the generally accepted meaning of "fixed block architecture" (FBA), all data sectors 254 are substantially the same size, usually expressed in bytes of data. However, it should be noted that the present invention may easily be utilized even if there are variations in data sector size.

Now referring to FIG. 3, read/write electronics 213 receives the electrical signal from the head 208 and passes servo signals (information) to servo electronics 212 and passes data signals to formatter 215. Servo electronics 212 uses the servo information to produce a current at 240 which drives voice coil 210 to move actuator arm 206 and therefore position head 208 over the desired track or ensure that head 208 which is already over the desired track remains over that track while reading/writing of that track is taking place. Interface electronics 214 provides the communication means between interface processor 219 and a host computer (not shown) over communication interface 262 where data and instructions are communicated. Interface processor 219 also communicates with the formatter electronics 215 over communication interface 264.

In operating drive 202, interface processor 219 receives a request for reading or writing data sectors 254 from the host through interface electronics 214 in the form of a logical block address (LBA) and a count. Formatter electronics 215 then receives a starting sector number, count, and list of skip sectors from interface processor 219. The LBA is translated into an estimated PBA (also referred to as "first order approximation of PBA") in interface processor 219 using the virtual track table of the defect map and the estimated PBA (EPBA) is thereafter communicated to servo processor 216. The defect map is preferably stored in buffer RAM 276. The EPBA is then translated into estimated ZCHS (EZCHS) value by servo processor 216 utilizing the information in the zone table. The zone table preferably resides at servo RAM 272 although it may alternatively reside in any other type of storage medium. The zone table contains entries with the required information for conversion of PBA/EPBA into a ZCHS/EZCHS. The EZCHS information is consequently used to initiate a seek operation by passing the voice coil 210 current information to servo electronics 212 in order to move actuator arm 206 and head 208 toward the estimated track target.

Concurrently with the seek operation of the estimated track, interface processor 219 carries on an exact calculation of the PBA using both the virtual track table and the virtual sector table of the defect map and then communicates the exact PBA information to servo processor 216 over communication interface 270. The defect map 450 resides at buffer RAM 276 although it may alternatively reside in any other type of storage medium. Servo processor 216, after converting the exact PBA to the ZCHS value, provides updated ZCHS information to the interface processor 219 and adjusts the amount of current in voice coil 210, thus causing head 208 to be moved toward and positioned over the actual (desired) track rather than the estimated track.

Using LBA to PBA search and ZCHS value from servo processor 216, interface processor 219 then computes track transfers which consists of starting sector number, count and list of skip sectors. Formatter electronics 215 then receives a starting sector number, count, and list of skip sectors from interface processor 219.

Once servo processor 216 has positioned head 208 over the actual track, servo electronics 212 begins executing sector computation in order to locate and identify the desired data sector. As servo sectors 220 pass under head 208, the no-ID approach described in the aforementioned U.S. Pat. No. 5,500,848 is used to identify each data sector. In brief, an index mark identifies the first servo sector on the track, an address mark locates subsequent servo sectors on that track, and a count of address marks uniquely identifies each servo sector on that track.

The ZCHS calculation in servo processor 216 may be communicated back to interface processor 219 over communication interface 270 so the servo processor's computation can be checked against the interface processor's own calculation as a way of checking the accuracy of ZCHS calculations in the servo processor as well as passed back to interface processor 219 and used "as is" with possibly some redundancy.

Figure 4:
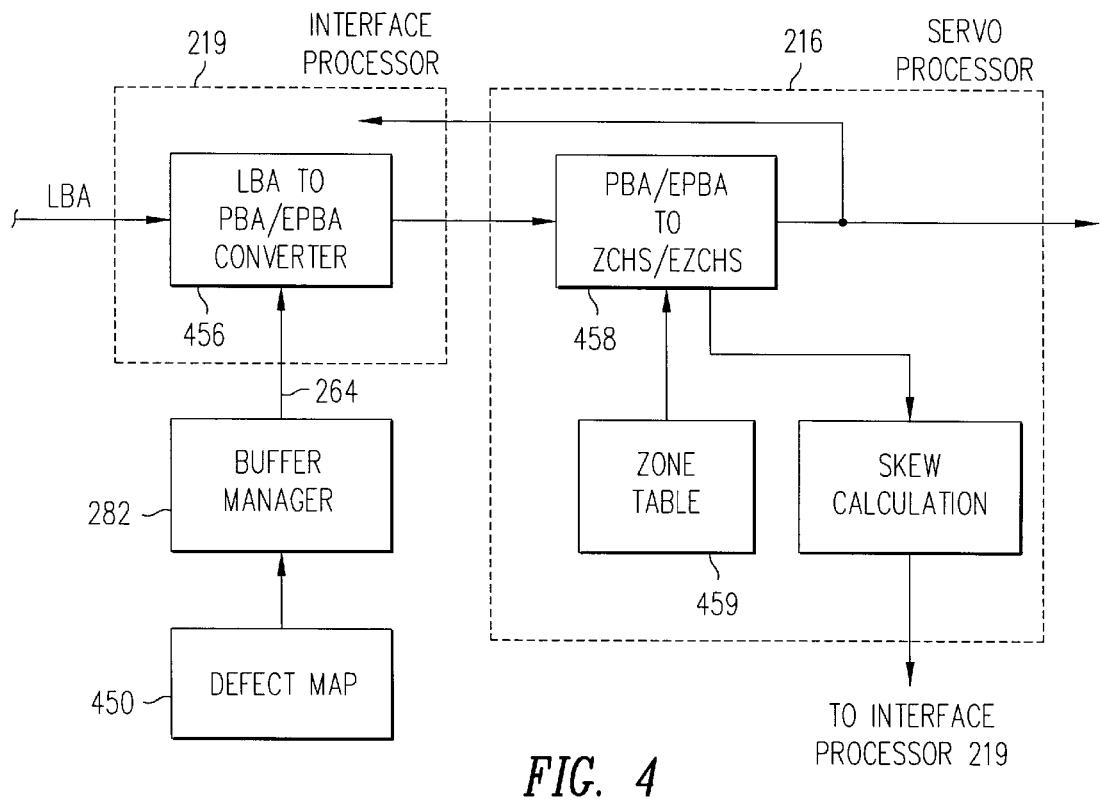
FIG. 4 is a high level block diagram showing LBA to ZCHS/EZCHS conversion in accordance with the preferred embodiment of the present invention.

FIG. 4 shows a high level block diagram showing an LBA to PBA/EPBA and a PBA/EPBA to ZCHS/EZCHS conversion utilizing interface processor 219, servo processor 216, defect map 450, and buffer manager 282 in accordance with the preferred embodiment of the present invention.

Figure 5:
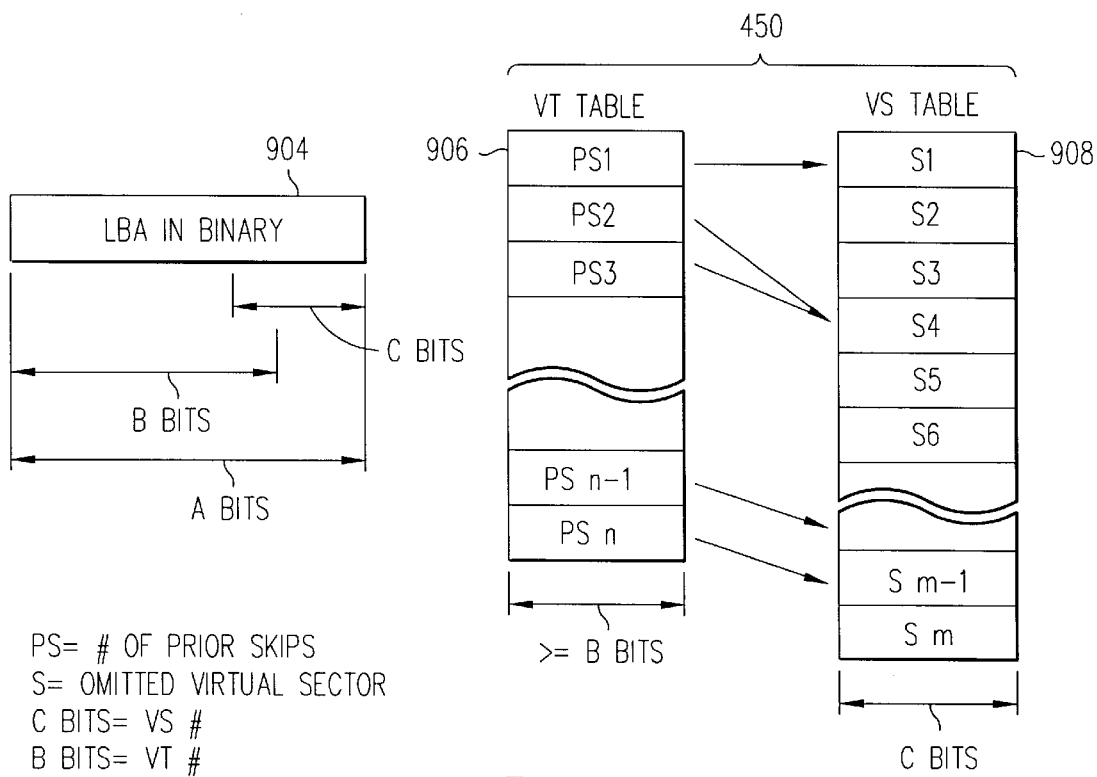
FIG. 5 is a schematic diagram showing an LBA to PBA mapping architecture in accordance with the preferred embodiment of the present invention.

FIG. 5 is a schematic diagram showing an LBA to PBA conversion architecture in accordance with the preferred embodiment of the present invention.

Now referring to FIGS. 3, 4 and 5, in order to find the desired data sector on a track of disk 204, a logical block address (LBA) received from the host must be converted into a ZCHS value. In general, this involves first converting the LBA, which is the user identifier for the data sector, into a physical block address (PBA) which is a mapping of the LBA into the physical space of the drive. The conversion is carried out using defect map 450. Defect map 450 which preferably resides in buffer RAM 276 is a list of defects and spares on each disk drive and the position of those defects and spares. In the preferred embodiment of the present invention, defect map 450 comprises a virtual track table 906 and a virtual sector table 908 as taught in the co-pending U.S. patent application Ser. No. 08/628,304, in defect map 450 only low order bits of each LBA is used to identify each defect on the disk. By minimizing the number of bits required in identifying each defect on the disk, LBA to PBA conversion is greatly improved while saving valuable RAM space where the defect map is stored.

As mentioned above, defect map 450 is implemented as a pair of tables known as a virtual track (VT) table 906 and virtual sector (VS) table 908. VT table 906 contains entries for virtual tracks which are defined as groups of LBAs having shared high order bits. VS table 908 contains entries representing only the low order bits of the LBA corresponding to skip sectors on the disks. The output of the VT/VS table access, referred to as the PBA, is then converted into a ZCHS value using the information in the zone table.

Now referring primarily to FIG. 5, there is shown the LBA to PBA mapping architecture which forms the basis for the LBA to PBA portion of the conversion process. In particular, FIG. 5 shows a typical LBA represented in binary format at 904, VT table 906, and VS table 908. As shown at 904, the full length of the LBA in bits is shown as A. The LBA is initially received from the host computer by interface electronics 262 and is communicated to interface processor 219. If required, interface processor 219 may convert the LBA initially received to a "new" LBA using the following function:

new $LBA = M*LBA + B$ where

M=number of sectors per customer LBA; and

B=first actual LBA of customer data.

The LBA is preferably subdivided into two sections. The high order portion, designated as B portion, includes the number of bits required to hold the virtual track number, and the low order portion, designated as C portion, includes the number of bits required to hold the virtual sector number. In the preferred embodiment, the LBA comprises 4 bytes where the B portion comprises two bytes that are dedicated to hold virtual track number and the C portion comprises two bytes that are dedicated to hold the virtual sector number.

A virtual track (VT) is defined as a contiguous set of data sectors which have exactly $2^{(A-B)}$ good data sectors. A virtual track may contain both good sectors and skip sectors or alternatively, it may contain only good sectors. Good sector is a sector having no skip; skip sector is a sector which is either a spare or defect; and spare sector is a sector set aside by the processor as not used. In the preferred embodiment, each virtual track contains 65536 bytes of good information. All virtual tracks are contiguous with one another starting from a defined virtual track of zero at the beginning of the disk drive and running through the entire disk drive. The virtual track number may be obtained from the LBA either by simply accessing the high order bits of the LBA or by logically shifting the LBA to the right by the quantity A–B shifts.

A virtual sector (VS) is defined as a good sector contained within a virtual track. There are $2^{(A-B)}$ different virtual sector numbers available. Thus, all virtual sectors within a virtual track are numbered consecutively starting at the first good sector in the track and ending at the last good sector in the track.

Given a subdivision of an LBA into a virtual track number and a virtual sector number, the virtual track number is referenced into virtual track table 906 in order to obtain an index point into virtual sector table 908. The index point is then used as a starting point in VS table 908 at which a sequential search is commenced, which search continues until a virtual sector number which is higher than the searched-for virtual sector number is located in virtual sector table 908 or the index exceeds the entry for the next virtual track. Once the appropriate entry is found, the PBA is computed as the received LBA plus an index into VS table 908 corresponding to the final search entry.

Note that virtual track table 906 contains an entry corresponding to every virtual track in the disk drive. Each entry is at least B bits wide and contains a pointer into virtual sector table 908. In operation, VT table 906 is entered by indexing into it according to the value of B portion, the virtual track number, which is obtained from LBA 904. The value found at the determined index point is then added to the start of virtual sector table 908 to locate the first skip sector associated with the applicable virtual track.

Unlike virtual track table 906, virtual sector table 908 does not contain an entry for every virtual sector on the disk drive. In contrast, virtual sector table 908 contains entries only for skip sectors (defective sectors and/or spare sectors).

As discussed above, virtual sector table 908 is entered at the index value established through use of virtual track table 906. Starting at that index value, a sequential search is conducted against the value of the C bits received from the low order of LBA value 904 until a virtual sector number is located which is greater than the value obtained from the low order C bits of 904. This greater than virtual sector number establishes the number of skips which must be passed in order to arrive at the current virtual sector number.

Given that the equation for converting LBA to PBA comprises as follows:

$$PBA = LBA + VT(vt) + \text{number of } VS(i) \quad \text{(Equation 1)}$$

where vt=leftmost B bits of LBA=virtual track number vs=rightmost C bits of LBA=virtual sector number $VS(i) \leq vs$ VT( ) table=virtual track table VS( ) table=virtual sector table i=an index into the VS table such that:

$VT(vt) \leq i < VT(vt+1)$ the term "LBA+VT(vt)" is known as first order approximation for PBA (also referred to as estimated PBA (EPBA)) and the term "number of VS(i)" is known as an offset from the first entry in the VS table for the vt. The terms "LBA+VT(vt)" and "number of VS(i)" together provides an exact value for PBA.

Given the Equation 1, it can readily be seen that the time involved in calculating the exact PBA value is the function of the time it takes to calculate the terms "LBA+VT(vt)" and "number of VS(i)". It can also be appreciated that the calculation of the term "number of VS(i)" could take a substantial amount of time depending directly on how many VS entries are there to be searched multiplied by the time it takes to access the medium where the table is stored. A substantial amount of time, as stated earlier, can be saved by allowing interface processor 219 to calculate the first order approximation of PBA and immediately communicating that approximation to servo processor 216, thus allowing the servo processor to initiate the seek operation. Meanwhile, interface processor 219 continues to calculate the second term of the Equation 1, i.e., "number of VS(i)", and when that computation is completed communicate an exact PBA value to servo processor 216. The servo processor then uses the exact PBA to replace the estimated track seek target and move actuator arm 206 toward the desired track by changing the current flow in the voice coil 210. As stated earlier, by having the actuator in motion toward the track target rather than waiting until the exact track address is calculated, substantial reduction in seek time overhead can be attained. For example, computation of an estimated PBA may fall substantially in the range of about 10 to 20 microseconds whereas the exact PBA calculation can fall in the range of about 100 to 300 microseconds.

In the preferred embodiment of this invention, the conversion of LBA to ZCHS/EZCHS is a two step process, where the step of converting LBA into a PBA/EPBA is carried out at interface processor 219 and the step of converting PBA/EPBA to ZCHS/EZCHS is carried out at servo processor 216. The reason for having a two step conversion process is because since the servo processor is typically a much faster processor than the interface processor, by moving the PBA/EPBA to ZCHS/EZCHS conversion calculations to the servo processor, the whole process of LBA to ZCHS conversion can be substantially speeded up, thus further reducing the overall conversion time and increasing seek performance. For example, the PBA to ZCHS conversion can take about 25 to 35 microseconds in the interface processor whereas substantially the same computation may take only about 5 to 10 microseconds in the servo processor.

In the preferred embodiment, the servo processor carries on the PBA/EPBA to ZCHS/EZCHS conversion using a zone table. The zone table contains entries to facilitate PBA/EPBA to ZCHS/EZCHS conversion. The entries are: zone starting PBA, zone starting cylinder and number of sectors per track. Zone table includes an entry for each zone in the disk drive as well as an entry for the last boundary condition. The zone table is preferably stored in RAM, but may alternatively be stored on any other type of storage media. The detail of zone table implementation for the purpose of PBA to ZCHS conversion is shown in the co-pending U.S. patent application Ser. No. 08/628,304 and is incorporated herein by reference.

The zone table may also contain entries to facilitate ZCHS skew calculation which, as mentioned earlier, may be communicated back to the interface processor as a check against the interface processor's own calculation. The following additional entries are added to the zone table for carrying on such skew calculation: track skew, cylinder skew, and zone starting skew. The track skew is the maximum number of data sectors which pass by while moving from one head to the next. The cylinder skew is the maximum number of data sectors which pass by while moving from the last head on a cylinder to the first head of the next cylinder. The zone starting skew is the starting skew for it's zone.

Utilizing the above entries in the zone table the skew can be computed by the servo processor as shown below.

Skew=zone starting skew+((cylinder−zone starting cylinder)*cylinder skew sum+head*track skew) modulo number of sectors per track where cylinder skew sum=(number of heads−1)*track skew+ cylinder skew.

Figure 6A:
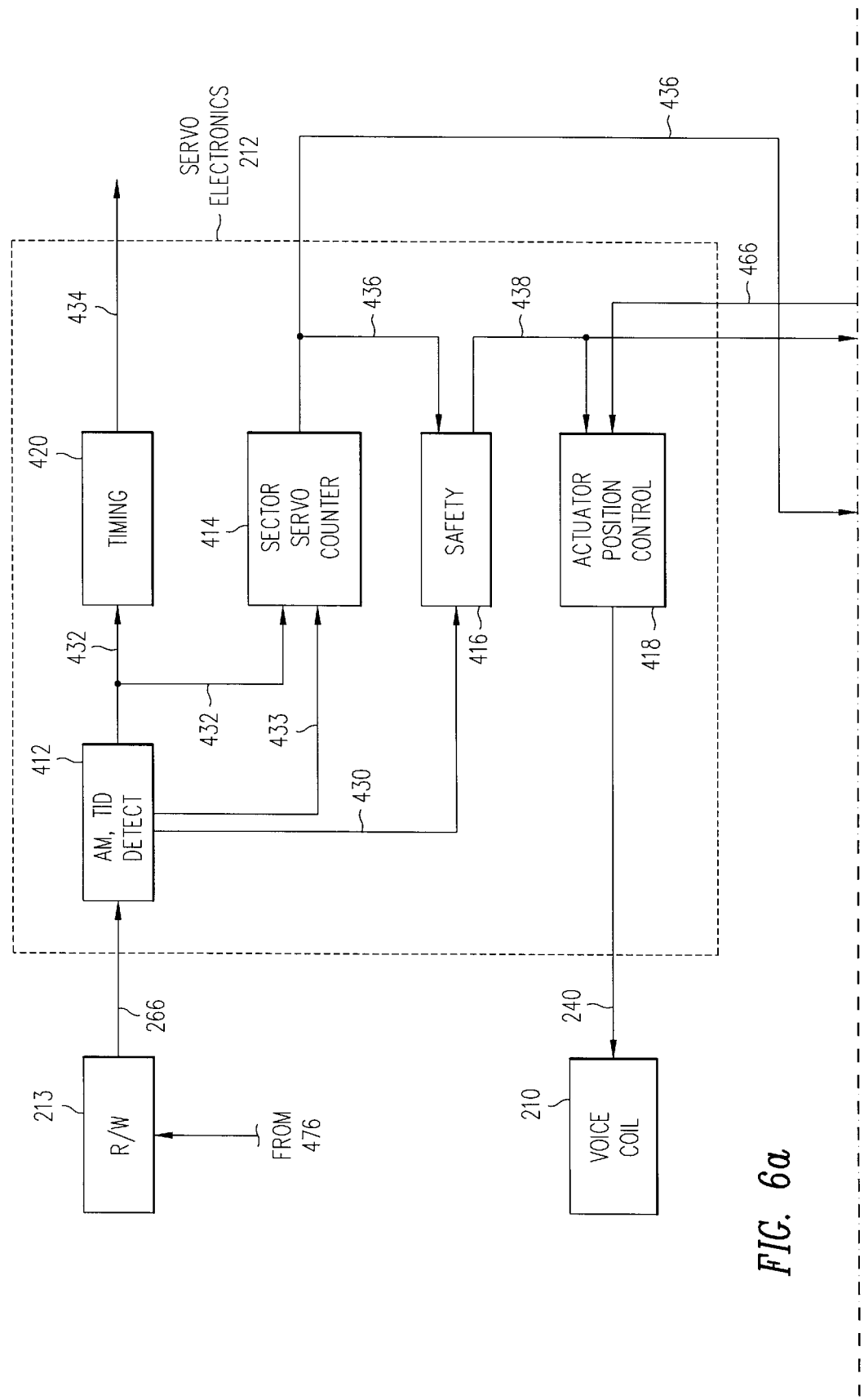
FIG. 6 is a block diagram showing a hardware embodiment of the preferred embodiment of FIG. 4.

Now referring to FIG. 6, there is shown a hardware representation of the preferred embodiment of the present invention. Servo electronics 212 comprises address mark (AM) detector and track number decoder (TID) 412, servo sector counter 414, safety logic 416, actuator position control logic 418, and timing generation logic 420. Interface processor 219 comprises an LBA to PBA/EPBA converter 456. Formatter electronics 215 comprises sector pulse generation logic 421, format table 422, data sector identifier 454, control function 476, buffer manager 282, and Target Generation Logic 462. Servo processor 216 comprises a PBA/EPBA to ZCHS/EZCHS converter 458 and zone table 459 which is stored preferably at servo RAM 272. The hardware implementation also comprises a buffer RAM 276, an interface electronics 214, voice coil 210, and read/write (R/W) electronics 213.

In operation, interface processor 219 receives the request for a read or write operation on a data sector(s) from the host system (not shown). The request is communicated over interface 262 to interface electronics 214 and from there is communicated to interface processor 219 over communication link 273. The requested (sought after) sector is identified by its LBA. The LBA is initially converted to an EPBA by converter 456 using appropriate entry in virtual track table 906 of defect map 450 as explained in detail previously.

In the preferred embodiment, the entries in defect map 450 are communicated to interface processor 219 through buffer manager 282 where the buffer manager is part of formatter 215. The EPBA information which is the output of converter 456 is then transmitted to servo processor 216 over interface bus 270. Servo processor 216 in turn converts the EPBA value to its equivalent EZCHS value by utilizing converter 458 and zone table 459 as explained in detail previously. Once the EZCHS value becomes available, servo processor 216 communicates the estimated cylinder and head values in the form of current to actuator position control logic 418 via interface 466 to effectuate an estimated track seek operation. Actuator position control logic 418 functions in a manner known in the art by providing appropriate current 240 to voice coil 210 to effectuate the movement of the actuator arm 206 toward the estimated track target.

While servo electronics 212 and formatter 215 are processing EZCHS value and move head 208 toward the estimated track, interface processor 219 converts LBA to exact PBA using both virtual track table and virtual sector table in defect map 450 and communicates the exact PBA to servo processor 216. Servo processor 216 in turn converts the PBA to actual ZCHS value using converter 458 and zone table 459. The actual ZCHS value is then communicated to interface processor 219. Furthermore, the track information obtained from servo processor 216 and LBA to PBA is also used to generate starting sector number, count, and skip sector list which is then communicated to target generation logic 462. Once servo electronics 212 finds a match between the ZCHS value read back from the disk with the actual ZCHS value, then track seeking operation is terminated and track following operation is initiated where data is either read back or written onto sectors.

Servo electronics 212 also receives, among other things, servo information via interface 266 from R/W electronics 213. AM detector 412 detects the servo address mark, and communicates address mark found via interface 432 to servo sector counter 414. Address mark is also communicated to timing logic 420 via interface 432, which generates the timing signal at 434 necessary for operation of servo electronics 212 in a manner known in the requisite art. In addition, address marker detector 412 decodes the TID information, including cylinder number, servo index, servo sector number, and head number and communicates them to safety logic 416. Detector 412 also provides index signal to counter 414 via interface 433, which is used to reset servo sector counter 414. Counter 414 is also incremented by address marker found signal, communicated via interface 432, at each subsequent servo. In this manner, servo sector counter 414 will always output the current servo sector number at its output.

Safety logic 416 also receives decoded TID information from detector 412 via interface 430. Safety logic 416 also receives servo sector number from counter 414 via interface 436. Safety logic 416 performs various safety tests to ensure the proper operation of the servo electronics. Its functions include comparing the current servo sector number received via interface 436 with any servo sector number information in the TID and processing any error handling information in the TID. Error information, along with the cylinder and head number, are output over interface 438. Actuator position control 418 compares the cylinder and head values received via interface 438 with the estimated values received over interface 466, and acts upon any errors. Sector pulse logic 421 uses servo sector number received over interface 436 to generate the address for format table 422, thus retrieving segment information 440 for the zone. Sector pulse logic 421 also contains three counters: a sync counter, a data counter, and a pad counter. Each of these counters is used to count byte clocks during the various fields in the format, whereby the data sectors are located and identified. Sector pulse logic 421 is thereby able to identify both the starting location and the data sector number of the data sector about to pass under recording head 208. The current start of data sector condition 444 is sent to data sector identifier 454 when the start of a data sector is under the head, thus enabling formatter 215 to perform functions with zero latency. Upon receipt of sector condition 444, data sector identifier 454 compares the current data sector number 442 to the target sector value 464 received from target generation logic 462. If a match is found, the sector pulse is passed via 470 to control information logic 476, at which point the data sector is further processed in accordance with methods known in the prior art.

Figure 7:
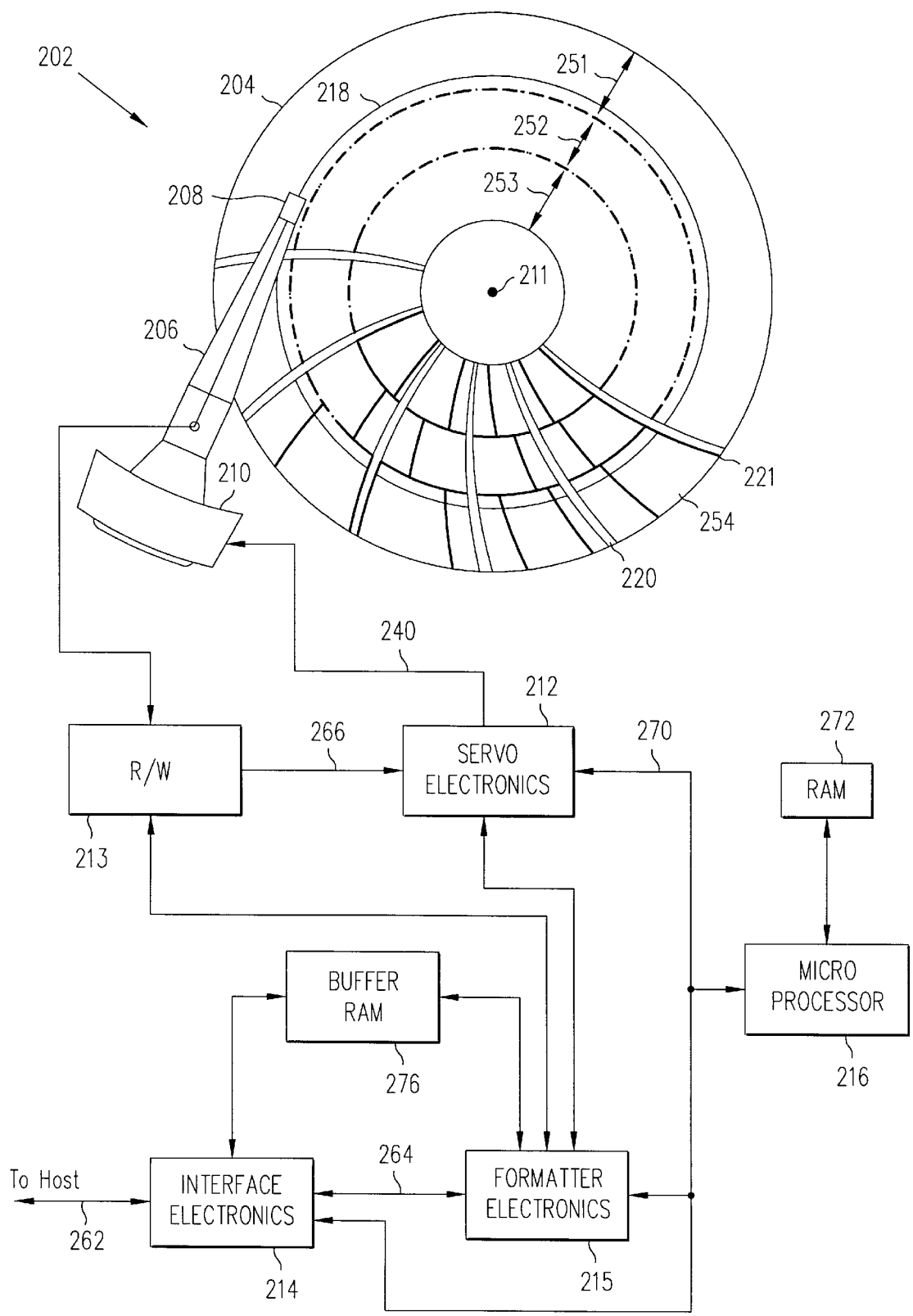
FIG. 7 is a schematic diagram showing an alterative FBA disk drive of the present invention having a single processor.

Now referring to FIG. 7, there is shown an alternative embodiment of the present invention utilizing a single microprocessor 216 rather than two processors. In this embodiment, processor 216 initially calculates a first order approximation of PBA and uses that information to initiate the estimated seek operation. Concurrent with initiation of the estimated seek operation, the processor 216 also calculates the exact PBA and as the estimated seek operation is taking place, uses the exact PBA to adjust the seek operation toward the actual track sought according to the preferred embodiment of the present invention. The details of LBA to PBA/EPBA and PBA/EPBA to ZCHS/EZCHS conversions are the same as those described previously under the preferred embodiment.

In an alternative embodiment, the LBA to PBA/EPBA and PBA/EPBA to ZCHS/EZCHS conversions are both carried out in the interface processor and the ZCHS/EZCHS value is then communicated to the servo processor rather than calculating ZCHS/EZCHS by the servo processor.

In an alternative embodiment LBA is initially communicated to the servo processor prior to calculating either EPBA or exact (actual) PBA. The LBA is converted to ZCHS and utilized to initiate a track seek operation. Meanwhile, LBA is converted to the EPBA and communicated to the servo processor. The rest of the operation remains the same as the preferred embodiment.

A number of embodiments of the present invention have been described. Nevertheless, it will be understood that various modifications may be made without departing from the spirit and the scope of the invention. Accordingly, it is to be understood that the invention is not to be limited by the specific illustrated embodiments, but only by the scope of the appended claims.

We claim:

1. A disk drive system, comprising:

a data recording disk having radially spaced tracks;

a target track on said disk, said target track having a logical block address (LBA);

a processor for computing an estimated physical address of said target track only from said LBA;

means for seeking said target track using said estimated physical address, said processor further computing an exact physical address of said target track while said seek operation is in progress; and means for adjusting said seek operation in progress using said exact physical address of said target track.

2. A disk drive system as recited in claim 1, wherein at least one track is divided into a plurality of segments, each segment comprising:

a data sector; and, a servo sector having means for uniquely identifying said data sector.

3. The disk drive system as recited in claim 2, wherein said processor comprises a mapping means for converting a logical block address (LBA) to an estimated cylinder head sector (CHS) address and an exact CHS address.

4. The disk drive system as recited in claim 2, wherein said data recording disk is further subdivided into radial recording zones; and said processor further comprises a mapping means for converting a logical block address (LBA) to an estimated zone cylinder head sector (ZCHS) address and an exact ZCHS address, said LBA comprising a plurality of bits subdivided into subsets of high order bits and low order bits.

5. The disk drive system as recited in claim 4, wherein said mapping means comprises a first mapping means for converting an LBA to a physical block address (PBA) and a second mapping means for converting said PBA to a ZCHS address, said PBA comprising a plurality of bits and said ZCHS comprising a plurality of bits.

6. The disk drive system as recited in claim 5, wherein said first mapping means further comprises:

an LBA to a PBA converter; and a defect map, said defect map comprising a virtual track (VT) table and a virtual sector (VS) table.

7. The disk drive system as recited in claim 6, where said VT table comprises entries for virtual tracks, each virtual track comprising LBAs having common high order bits, said VT table entries including high order bits of LBAs and wherein said VS table comprises entries arranged sequentially according to low order bits of LBAs, said VS table entries including index references to entries in said VT table.

8. The disk drive system as recited in claim 7, wherein said entries in the VT table comprise defective sectors and spare sectors on said data recording disk.

9. The disk drive system as recited in claim 5, wherein said second mapping means comprises:

a PBA to a ZCHS converter; and a zone table, said zone table including entries for PBA, cylinder and sectors for each zone in the disk drive.

10. A disk drive system, comprising:

a data recording disk having radially spaced tracks;

a target track on said disk, said target track having a logical block address (LBA);

an interface processor in combination with a servo processor for computing an estimated physical address of said target track only from said LBA;

servo electronics in combination with said servo processor for seeking said target track using said estimated physical address, said combination of interface processor and servo processor further computing an exact physical address of said target track while said seek operation is in progress; and said servo electronics in combination with said servo processor adjusting said seek operation in progress using said exact physical address of said target track.

11. A disk drive system as recited in claim 10, wherein at least one track is divided into a plurality of segments, each segment comprising:

a data sector; and, a servo sector having means for uniquely identifying said data sector.

12. The disk drive system as recited in claim 11 wherein said interface processor comprises a first mapping means for converting a logical block address (LBA) to an estimated physical block address (PBA) and an exact PBA address, said LBA comprising a plurality of bits subdivided into subsets of high order bits and low order bits.

13. The disk drive system as recited in claim 12, wherein said servo processor comprises a second mapping means for converting a PBA to an estimated cylinder head sector (CHS) address and an exact CHS address.

14. The disk drive system as recited in claim 12, wherein
said data recording disk is further subdivided into radial recording zones; and,
said servo processor further comprises a second mapping means for converting a PBA to an estimated zone cylinder head sector (ZCHS) address and an exact ZCHS address.

15. The disk drive system as recited in claim 14, wherein said first mapping means further comprises:
an LBA to a PBA converter; and
a defect map, said defect map comprising a virtual track (VT) table and a virtual sector (VS) table.

16. The disk drive system as recited in claim 15, where said VT table comprises entries for virtual tracks, each virtual track comprising LBAs having common high order bits, said VT table entries including high order bits of LBAs and wherein said VS table comprises entries arranged sequentially according to low order bits of LBAs, said VS table entries including index references to entries in said VT table.

17. The disk drive system as recited in claim 16, wherein said entries in the VT table comprise defective sectors and spare sectors on said data recording disk.

18. The disk drive system as recited in claim 14, wherein said second mapping means comprises:
a PBA to a ZCHS converter; and
a zone table, said zone table including entries for PBA, cylinder and sectors for each zone in the disk drive.

19. In a disk drive system comprising a data recording disk having radially spaced tracks, each track having a logical block address (LBA), read/write electronics in communication with said tracks, servo electronics in communication with said read/write electronics, an actuator arm having a magnetic head in communication with said servo electronics and said read/write electronics, and a processor in communication with said servo electronics, a method of seeking a track, comprising the steps of:
computing, using said processor, an estimated physical address of a target track on said disk only from its LBA;
communicating said estimated physical address to said servo electronics;
seeking said target track using said estimated physical address;
computing, using said processor, an exact physical address of said target track on said disk while using said estimated physical address to seek said target track;
communicating said exact physical address to said servo electronics; and,
adjusting said seek in progress using said exact physical address of said target track.

20. A method as recited in claim 19, wherein at least one track is divided into a plurality of segments, each segment comprising:
a data sector; and
a servo sector having means for uniquely identifying said data sector.

21. A method as recited in claim 20, wherein
said data recording disk is further subdivided into radial recording zones; and,
said processor further comprises a mapping means for converting a logical block address (LBA) to an estimated zone cylinder head-sector (ZCHS) address and an exact ZCHS address, said LBA comprising a plurality of bits subdivided into subsets of high order bits and low order bits.

22. A method as recited in claim 21, wherein said mapping means comprises a first mapping means for converting an LBA to a physical block address (PBA) and a second mapping means for converting said PBA to a ZCHS address.

23. A method as recited in claim 22, wherein said first mapping means comprises:
an LBA to a PBA converter; and,
a defect map, said defect map further comprising:
a virtual track (VT) table comprising entries for virtual tracks, each virtual track comprising LBAs having common high order bits, said VT table entries including high order bits of LBAs; and,
a virtual sector (VS) table comprising entries arranged sequentially according to low order bits of LBAs, said VS table entries including index references to entries in said VT table.

24. A method as recited in claim 23, wherein said entries in the VT table comprise defective sectors and spare sectors on said data recording disk.

25. A method as recited in claim 24, wherein said second mapping means comprises:
a PBA to a ZCHS converter; and
a zone table, said zone table including entries for PBA, cylinder and sectors for each zone in the disk drive.

26. In a disk drive system comprising a data recording disk having radially spaced tracks, each track having a logical block address (LBA), read/write electronics in communication with said tracks, servo electronics in communication with said read/write electronics, an actuator arm having a magnetic head in communication with said servo electronics and said read/write electronics, an interface processor in communication with a servo processor, said servo processor in communication with said servo electronics, a method of seeking a track, comprising the steps of:
computing, using said interface and servo processors, an estimated physical address of a target track on said disk only from its LBA;
communicating said estimated physical address to said servo electronics;
seeking said target track using said estimated physical address;
computing, using said interface and servo processors, an exact physical address of said target track on said disk while using said estimated physical address to seek said target track;
communicating said exact physical address to said servo electronics; and,
adjusting said seek in progress using said exact physical address of said target track.

27. A method as recited in claim 26, wherein at least one track on said disk is divided into a plurality of segments, each segment comprising:
a data sector; and
a servo sector having means for uniquely identifying said data sector.

28. A method as recited in claim 27 wherein said interface processor comprises a first mapping means for converting a logical block address (LBA) to an estimated physical block address (PBA) and an exact PBA address, said LBA comprising a plurality of bits subdivided into subsets of high order bits and low order bits, and said PBA comprising a plurality of bits.

29. A method as recited in claim 28, wherein
said data recording disk is further subdivided into radial recording zones; and, said servo processor further comprises a second mapping means for converting a PBA to an estimated zone cylinder head sector (ZCHS) address and an exact ZCHS address.

30. A method as recited in claim 29, wherein said first mapping means comprises:

an LBA to a PBA converter; and, a defect map, said defect map comprising:

a virtual track (VT) table comprising entries for virtual tracks, each virtual track comprises LBAs having common high order bits, said VT table entries including high order bits of LBAs; and, a virtual sector (VS) table comprising entries arranged sequentially according to low order bits of LBAs, said VS table entries including index references to entries in said VT table.

31. A method as recited in claim 30, wherein said entries in the VT table comprise defective sectors and spare sectors on said data recording disk.

32. A method as recited in claim 31, wherein said second mapping means comprises:

a PBA to a ZCHS converter; and a zone table, said zone table including entries for PBA, cylinder and sectors for each zone in the disk drive.

33. A disk drive system, comprising:

a data recording disk having radially spaced tracks;

a target track on said disk, said target track having a logical block address and an exact physical block address;

a processor for computing an estimated physical block address of said target track only from said logical block address using a defect map;

means for seeking said target track using said estimated physical block address, said processor computing said exact physical block address of said target track while seeking operation for seeking said target track using said estimated physical block address is in progress; and means for adjusting said seek operation in progress using said exact physical block address of said target track computed by said processor.

\* \* \* \* \*